US009607477B2

(12) United States Patent
Gagner et al.

(10) Patent No.: US 9,607,477 B2
(45) Date of Patent: Mar. 28, 2017

(54) USING CODED IDENTIFIERS FOR ADAPTIVE GAMING

(75) Inventors: Mark B. Gagner, West Chicago, IL (US); Benjamin R. Harry, Henderson, NV (US); Sean P. Kelly, Skokie, IL (US); Scott A. Massing, Lincolnwood, IL (US); Justin A. Perkins, Chicago, IL (US); Victor T. Shi, Morton Grove, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

(21) Appl. No.: 13/544,501

(22) Filed: Jul. 9, 2012

(65) Prior Publication Data

US 2013/0130779 A1 May 23, 2013

Related U.S. Application Data

(60) Provisional application No. 61/505,639, filed on Jul. 8, 2011.

(51) Int. Cl.
*A63F 13/00* (2014.01)
*G07F 17/32* (2006.01)

(52) U.S. Cl.
CPC ...... *G07F 17/3267* (2013.01); *G07F 17/3255* (2013.01); *G07F 17/3288* (2013.01)

(58) Field of Classification Search
CPC .................................................. G07F 17/3255
USPC ........................ 463/1, 25, 29, 30, 32, 42, 43
See application file for complete search history.

(56) References Cited

U.S. PATENT DOCUMENTS

| | | | |
|---|---|---|---|
| 2006/0046842 | A1 | 3/2006 | Mattice et al. |
| 2008/0113814 | A1 | 5/2008 | Osburn |
| 2009/0115133 | A1 | 5/2009 | Kelly et al. |
| 2009/0117994 | A1 | 5/2009 | Kelly et al. |
| 2009/0118001 | A1 | 5/2009 | Kelly et al. |
| 2009/0118005 | A1 | 5/2009 | Kelly et al. |
| 2009/0118006 | A1 | 5/2009 | Kelly et al. |

(Continued)

FOREIGN PATENT DOCUMENTS

| | | |
|---|---|---|
| EP | 1663419 | 2/2008 |
| EP | 1474214 | 4/2011 |

*Primary Examiner* — David L Lewis
*Assistant Examiner* — Robert Mosser
(74) *Attorney, Agent, or Firm* — DeLizio Law, PLLC

(57) ABSTRACT

A wagering game system and its operations are described herein. In some embodiments, the operations can include initiating a wagering game session for presentation of wagering game content. The operations can further include scanning a coded identifier during the wagering game session. The coded identifier indicates a characteristic associated with activity, events, achievements, etc. performed or attained prior to initiation of the wagering game session. For instance, the coded identifier can be a two-dimensional barcode generated in response to online activity (e.g., in response to progress attained in an online game). In some embodiments, the characteristics indicate information about the activity. The operations can further include adapting the wagering game content during the wagering game session based, at least in part, on the characteristic indicated in the coded identifier, such as providing gaming rewards and bonus games, adding funds, unlocking content, modifying wagering game content, etc.

21 Claims, 9 Drawing Sheets

(56) References Cited

U.S. PATENT DOCUMENTS

| | | | |
|---|---|---|---|
| 2009/0275393 | A1 | 11/2009 | Kisenwether et al. |
| 2010/0113140 | A1 | 5/2010 | Kelly et al. |
| 2011/0281641 | A1* | 11/2011 | Weller ............................ 463/25 |
| 2012/0004771 | A1 | 1/2012 | Walker et al. |
| 2012/0028695 | A1 | 2/2012 | Walker et al. |
| 2012/0118947 | A1 | 5/2012 | Lyons et al. |
| 2012/0122528 | A1 | 5/2012 | Lyons et al. |
| 2012/0122529 | A1 | 5/2012 | Lyons |
| 2012/0122558 | A1 | 5/2012 | Lyons et al. |

* cited by examiner

USING CODED IDENTIFIERS FOR ADAPTIVE GAMING

RELATED APPLICATIONS

This application claims the priority benefit of U.S. Provisional Application Ser. No. 61/505,639 filed Jul. 8, 2011.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

TECHNICAL FIELD

Embodiments of the inventive subject matter relate generally to wagering game systems and networks that, more particularly, use coded identifiers for adaptive gaming.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, road-side casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). However, online casinos face challenges and struggles. For instance, online casinos have struggled to provide the excitement and entertainment that a real-world casino environment provides. Some online casinos have struggled enforcing cross jurisdictional restrictions and requirements. Further, some online casinos have struggled adapting the online gaming industry to a traditionally non-wagering game business environment. As a result, wagering game manufacturers, casino operators, and online game providers are constantly in need of innovative concepts that can make the online gaming industry appealing and profitable.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
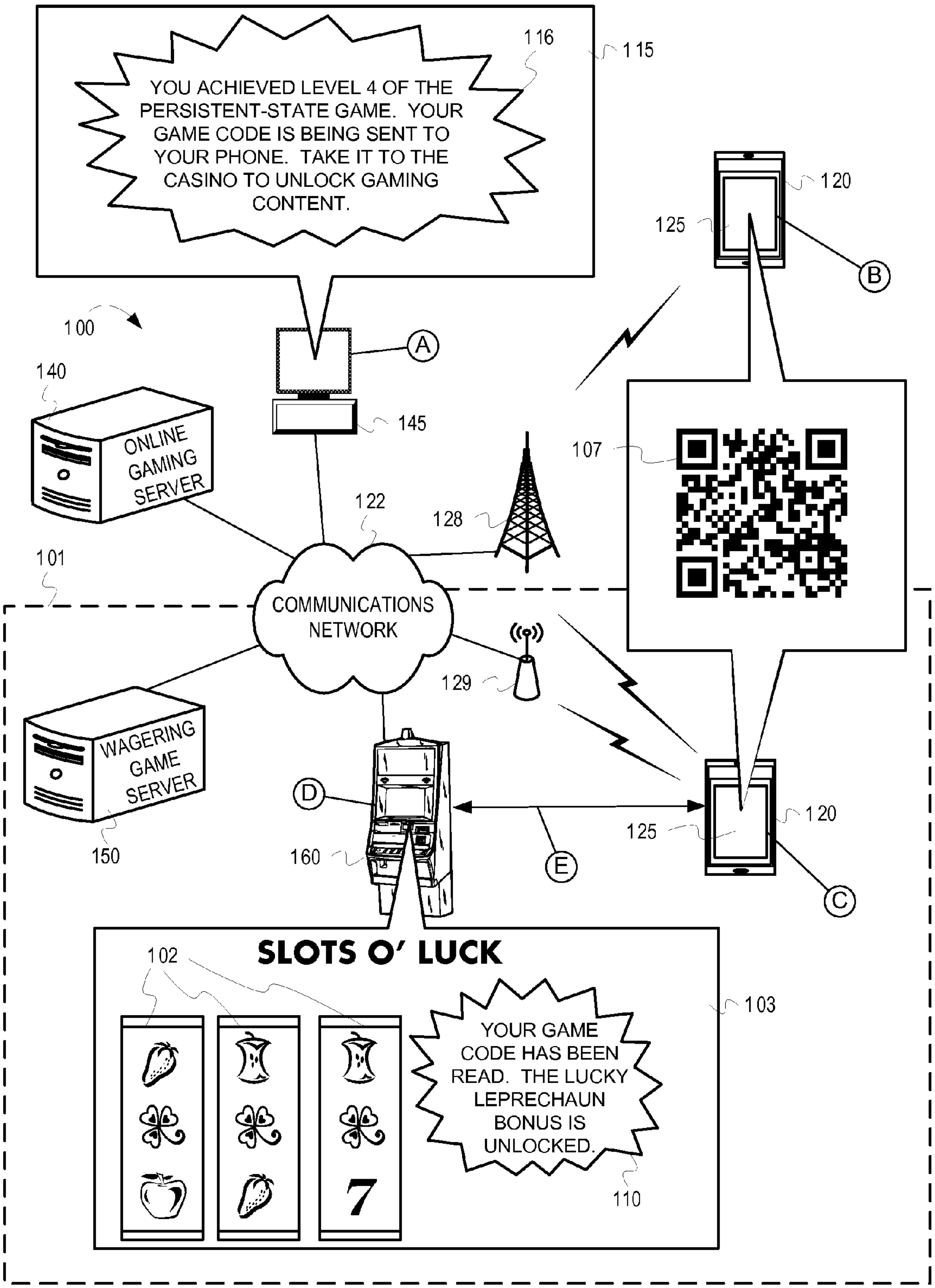
FIG. 1 is an illustration of generating and using coded identifiers for adaptive gaming, according to some embodiments.

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Wagering games are expanding in popularity. Many wagering game enthusiasts are demanding greater access to wagering games and content related to wagering games. As stated previously, some wagering game companies have created online wagering game websites that provide a way for wagering game enthusiasts to play wagering games while connected to the Internet (e.g., via a web-browser). Some online wagering game websites provide various features, such as social networks and social networking functionality. Social networks allow wagering game players ("players") to create social network user accounts with one or more unique identifiers that represent an online persona. One example of a unique identifier is an "avatar." Avatars are graphical, cartoon-like depictions of a social network persona. These online personas and associated avatars add to the fun of belonging to a social network. Wagering game providers are interested in providing interesting features to casino patrons as well as online gaming enthusiasts.

Some embodiments of the inventive subject matter include providing coded identifiers for game-related activity performed both inside and outside a casino. In some examples, coded identifiers are provided in response to non-wagering activity performed on the Internet (e.g., during play of persistent-state games and casual games) as well as in response to wagering game play on a wagering game machine. The coded identifiers can indicate characteristics related to the activity and can be used to transmit information about the activity or results of the activity (e.g., information about progress made in a persistent-state game, information about marketing activity performed online, etc.). Some embodiments provide the coded identifiers in a format that a player can transport to a casino, such as on a piece of paper (e.g. as a printed numerical code or as a graphic), on a mobile device (e.g., as an optical, machine-readable code, which the player can provide to a wagering game machine in a casino during a wagering game session), etc. An optical, machine-readable code may include, but not be limited to, a matrix code, a Quick Response (QR) code, a two dimensional barcode, etc. The coded identifier, when provided to the wagering game machine during the wagering game session, can unlock content, or result in other gaming rewards during the wagering game session. During the wagering game session, the wagering game machine can generate additional coded identifiers that the player can receive via a mobile client (e.g., via direct scan of the additional coded identifiers using a cell phone). The mobile client can store the additional coded identifiers for later use and/or transmit information about the additional coded identifiers, via a wireless network (e.g., via a mobile telephone network) that extends beyond the confines of the casino.

FIG. 1 is a conceptual diagram that illustrates an example of generating and using coded identifiers for adaptive gaming, according to some embodiments. In FIG. 1, a wagering game system ("system") 100 includes an online gaming server 140, a personal computer 145, a wireless transmission structure 128, a wagering game server 150, a wagering game machine 160, and a wireless access point 129 are connected to a communications network 122. The wagering game server 150, wagering game machine 160, and wireless access point 129 are within a physical gaming venue, such as a casino 101. The system 100 can also includes a mobile client 120 (e.g., a mobile phone) that communicates with other elements of the system 100 wirelessly, such as via wireless transmissions sent from the mobile client 120 to the wireless transmission structure 128.

At a first time (i.e., at stage "A"), the system presents online content 115, such as a non-wagering game, a persistent-state game, or other such content, using the personal computer 145. The online gaming server 140 hosts a website that provides the online content 115 to the personal computer 145. The system 100 detects that a player attains an achievement (e.g., as indicated via the message 116) during the online content 115. In response to attaining the achievement, the online gaming server 140 generates a coded identifier, such as matrix code 107.

At stage "B," the online gaming server 140 sends the matrix code 107 to the mobile client 120, such as via a multi-media text message, an email, a message presented in an application interface, etc. The online gaming server 140 can also store an indication in a player account that specifies the matrix code 107 as well as any information associated with the matrix code 107. The mobile client 120 can display the matrix code 107 via a display 125.

At stage "C," the system 100 detects that a player takes the mobile client 120 into the casino 101, and at stage "D," the system 100 detects player input at the wagering game machine 160. The player input is associated with a player that is assigned a wagering game player account. The system 100 initiates a wagering game session, in response to the player input, and the wagering game machine 160 presents wagering game content 103, such as a slot game with slot reels 102.

At stage "E," the system 100 detects that the mobile client 120 is positioned near the wagering game machine 160. The wagering game machine 160 reads the matrix code 107. In some embodiments, the mobile client 120 transmits the matrix code 107 via the wireless access point 129 to the wagering game server 150. In some embodiments, the wagering game machine 160 is configured with a scanning device that optically scans the matrix code 107 from the display 125 of the mobile client 120. The wagering game machine 160 and/or wagering game server 150 detect, via the matrix code 107, the information related to the achievement attained at stage "A" via the online content 115. The wagering game machine 160 and/or the wagering game server 150 use the information from the matrix code 107 to provide a gaming reward, such as unlocking gaming content as indicated in a message 110. In some embodiments, as explained later below, the system 100 can provide additional coded identifiers, during the wagering game session, and transmit the additional coded identifiers to the mobile client 120. For example, the mobile client 120 can include scanning mechanisms in the display 125 that read the additional coded identifiers presented by the wagering game machine 160. The mobile client 120 can transfer the additional coded identifiers to other elements of the system 100, such as to the online gaming server 140 (e.g., which can represent an adaptive gaming server, a player account server, a social network server, etc.), to the wagering game server 150, to the personal computer 145, etc.

Further, some embodiments of the inventive subject matter describe examples of using coded identifiers for adaptive gaming in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
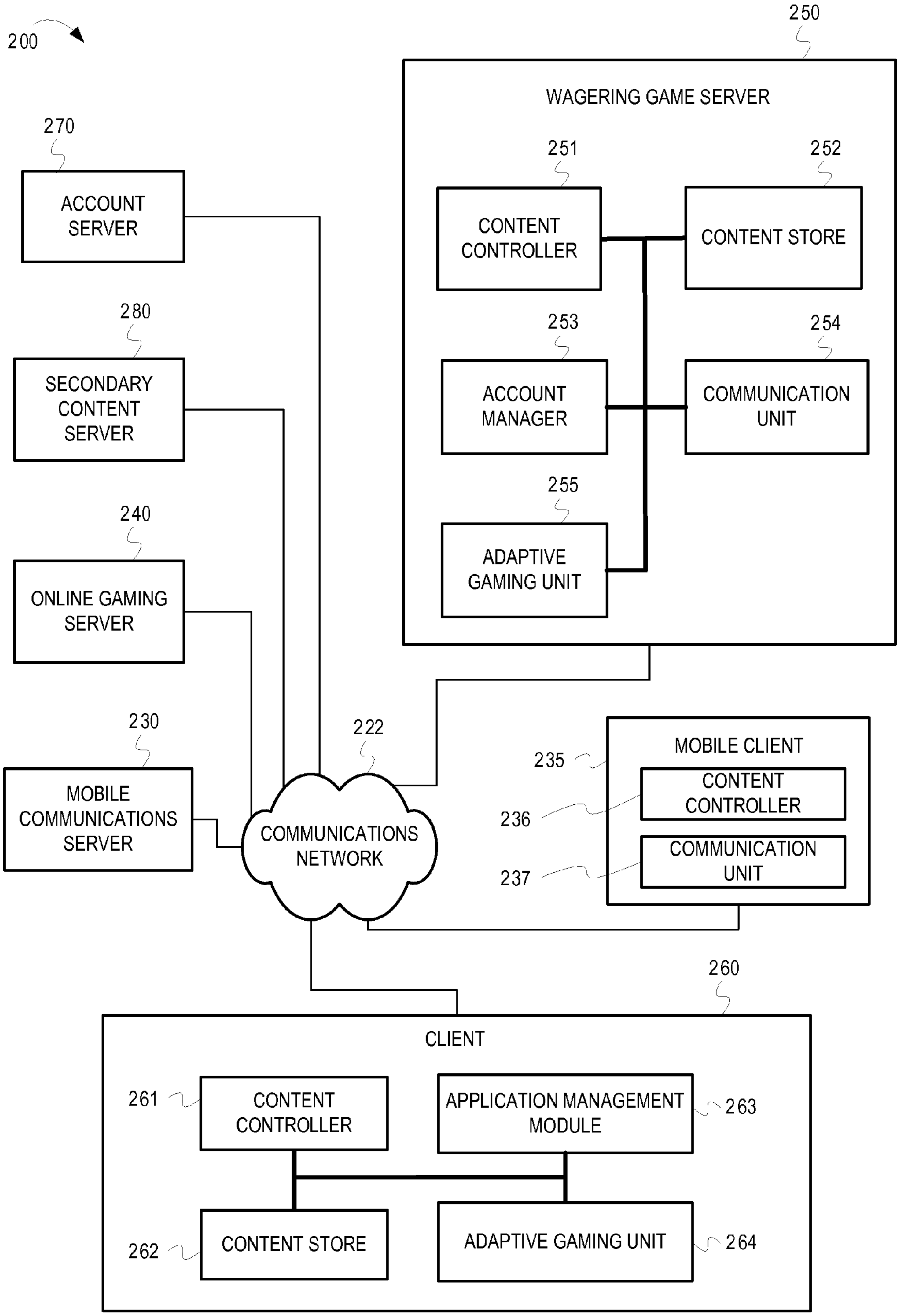
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to group games, settings related to social contacts, etc.), preferences (e.g., player preferences regarding use of coded identifiers, player preferences regarding mobile client settings, player preferences regarding award types, player preferences related to virtual assets, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from a client 260. The wagering game server 250 can include a content controller 251 configured to manage and control content for the presentation of content on the client 260. For example, the content controller 251 can generate game results (e.g., win/loss values), including win amounts, for games played on the client 260. The content controller 251 can communicate the game results to the client 260. The content controller 251 can also generate random numbers and provide them to the client 260 so that the client 260 can generate game results. The wagering game server 250 can also include a content store 252 configured to contain content to present on the client 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the client 260 and to communicate with other systems, devices and networks. The wagering game server 250 can also include an adaptive gaming unit 255 configured to generate coded identifiers in response to player input, track use of coded identifiers, and adapt gaming response to use of coded identifiers.

The wagering game system architecture 200 can also include the client 260 configured to present wagering games and receive and transmit information related to coded identifiers, a gaming session, adaptive gaming, persistent-state games, episodic content, etc. The client 260 is configured to generate coded identifiers, track use of coded identifiers, adapt gaming response to use of coded identifiers, etc. The client 260 can, in some embodiments, be a computer system, a personal digital assistant (PDA), a cell phone, a laptop, a wagering game machine, or any other device or machine that is capable of processing information, instructions, or other data provided via the communications network 222. The client 260 can include a content controller 261 configured to manage and control content and presentation of content on the client 260. The client 260 can also include a content store 262 configured to contain content to present on the client 260. The client 260 can also include an application management module 263 configured to manage multiple instances of gaming applications. For example, the application management module 263 can be configured to launch, load, unload and control applications and instances of applications. The application management module 263 can launch different software players (e.g., a Microsoft® Silverlight™ player, an Adobe® Flash® player, etc.) and manage, coordinate, and prioritize what the software players do. The application management module 263 can also coordinate instances of server applications in addition to local copies of applications. The application management module 263 can control window locations on a wagering game screen or display for the multiple gaming applications. In some embodiments, the application management module 263 can manage window locations on multiple displays including displays on devices associated with and/or external to the client 260 (e.g., a top display and a bottom display on the client 260, a peripheral device connected to the client 260, a mobile device connected to the client 260, etc.). The application management module 263 can manage priority or precedence of client applications that compete for the same display area. For instance, the application management module 263 can determine each client application's precedence. The precedence may be static (i.e. set only when the client application first launches or connects) or dynamic. The applications may provide precedence values to the application management module 263, which the application management module 263 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 263 of its current presentation state. The applications may provide presentation state values to the application management module 263, which the application management module 263 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 263 can be pre-configurable. The system can provide controls and interfaces for operators to control screen layouts and other presentation features for the configuring of the application management module 263. The application management module 263 can communicate with, and/or be a communication mechanism for, a base game stored on a wagering game machine. For example, the application management module 263 can communicate events from the base game such as the base game state, pay line status, bet amount status, etc. The application management module 263 can also provide events that assist and/or restrict the base game, such as providing bet amounts from secondary gaming applications, inhibiting play based on gaming event priority, etc. The application management module 263 can also communicate some (or all) financial information between the base game and other applications including amounts wagered, amounts won, base game outcomes, etc. The application management module 263 can also communicate pay table information such as possible outcomes, bonus frequency, etc. In some embodiments, the application management module 263 can control different types of applications. For example, the application management module 263 can perform rendering operations for presenting applications of varying platforms, formats, environments, programming languages, etc. For example, the application management module 263 can be written in one programming language format (e.g., Javascript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 263 can include a portable virtual machine capable of generating and executing code for the varying platforms, formats, environments, programming languages, etc. The application management module 263 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The client 260 can also include an adaptive gaming unit 264 configured to generate coded identifiers in response to player input, track use of coded identifiers, and adapt gaming response to use of coded identifiers.

The wagering game system architecture 200 can also include a mobile client 235 configured to receive and transmit data related to coded identifiers, a gaming session, adaptive gaming, persistent-state games, episodic content, etc. In some embodiments, the mobile client 235 includes a content controller 236 configured to control content, applications, etc. The mobile client 235 further includes a communication unit 237 configured to control mobile communications. The mobile client 235 may also be referred to as a handheld device, a handheld computer or simply handheld. In some embodiments, the mobile client 235 is a pocket-sized computing device, having a display screen with touch input and/or a miniature keyboard. Some examples of the mobile client 235 may include, but are not limited to a personal digital assistant (PDA), a cell phone, a laptop, a smartphone, a mobile computer, a mobile internet device, a portable media player, a mobile phone, a pager, a personal navigation device, or any other device or machine that is capable of wirelessly processing information, instructions, or other data. In some embodiments, the mobile client 235 may include integrated data capture devices like barcode readers, radio frequency identification (RFID) readers, in-cell scanners, and smart card readers. In some embodiments the mobile client 235 is personal (i.e., belongs to a user), which the user can carry on their person.

The wagering game system architecture 200 can also include a secondary content server 280 configured to provide content and control information for secondary games and other secondary content available on a wagering game network (e.g., secondary wagering game content, promotions content, advertising content, player tracking content, web content, etc.). The secondary content server 280 can provide "secondary" content, or content for "secondary" games presented on the client 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 280 can provide and control content for community games, including networked games, social games, competitive games, or any other game that multiple players can participate in at the same time. In some embodiments, the secondary content server 280 can control and present an online website that hosts wagering games. The secondary content server 280 can also be configured to present multiple wagering game applications on the client 260 via a wagering game website, or other gaming-type venue accessible via the Internet. The secondary content server 280 can host an online wagering website and/or a social networking website. The secondary content server 280 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 280 can also be configured to generate coded identifiers in response to player input, track use of coded identifiers, and adapt gaming response to use of coded identifiers. In some embodiments, the secondary content server 280 can also host social networking accounts, provide social networking content, control social networking communications, store associated social contacts, etc. The secondary content server 280 can also provide chat functionality for a social networking website, a chat application, or any other social networking communications mechanism. In some embodiments, the secondary content server 280 can utilize player data to determine marketing promotions that may be of interest to a player account. The secondary content server 280 can also analyze player data and generate analytics for players, group players into demographics, integrate with third party marketing services and devices, etc. The secondary content server 280 can also provide player data to third parties that can use the player data for marketing. In some embodiments, the secondary content server 280 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message.

The wagering game system architecture 200 can also include a online gaming server 240 configured to control and present an online website that hosts gaming related content (e.g., wagering games, non-wagering games that share common themes to wagering games, social networking content related to gaming, etc.). The online gaming server 240 can also be configured to present multiple wagering game applications via the client 260 (e.g., via a browser application or widget installed on the client 260) and/or via the mobile client 235. The online gaming server 240 can be configured to present content via a wagering game website, or other gaming-type venue accessible via the Internet. The online gaming server 240 can also host a social networking website or social network. The online gaming server 240 can include mechanisms that provide functionality (e.g., controls, web pages, applications, etc.) that web users can use to connect to a social networking application and/or website and utilize social networking and website features (e.g., communications mechanisms, applications, etc.).

The wagering game system architecture 200 can also include a mobile communications server 230 configured to provide and control mobile content and communications, such as email, text messages, instant messages, mobile applications, etc. The mobile communications server 230 can utilize GSM (Global System for Mobile communications) protocols, the Short Message Service (SMS), or other communication standards associated with mobile communications, text messaging, email, instant messaging, mobile applications, etc. The wagering game system architecture 200 can also include a communications network antenna configured to receive and transmit mobile communications to and from the mobile communications server 230.

Each component shown in the wagering game system architecture 200 is shown as a separate and distinct element connected via a communications network 222. However, some functions performed by one component could be performed by other components. For example, the wagering game server 250 can also be configured to perform functions of the application management module 263, the adaptive gaming unit 264, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the client 260 instead of, or in addition to, being a part of the wagering game server 250. Further, in some embodiments, the client 260 can determine wagering game outcomes, generate random numbers, etc. instead of, or in addition to, the wagering game server 250.

As mentioned previously, in some embodiments, the client 260 can take the form of a wagering game machine. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
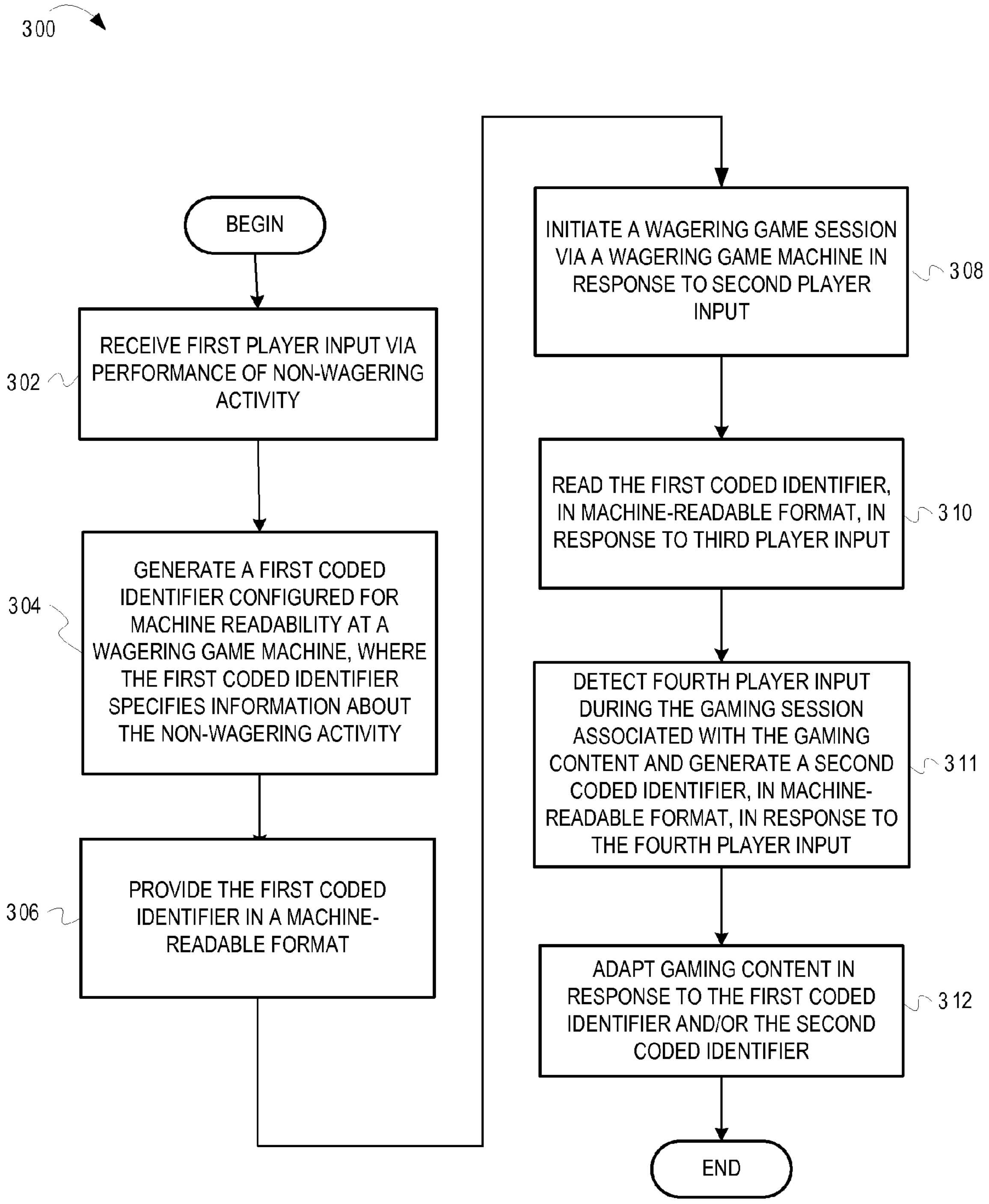
FIG. 3 is a flow diagram 300 illustrating generating and using coded identifiers for adaptive gaming, according to some embodiments.

FIG. 3 is a flow diagram ("flow") 300 illustrating generating and using coded identifiers for adaptive gaming, according to some embodiments. FIGS. 4 and 5A-5C are conceptual diagrams that help illustrate the flow of FIG. 3, according to some embodiments. This description will present FIG. 3 in concert with FIGS. 4 and 5A-5C. In FIG. 3, the flow 300 begins at processing block 302, where a wagering game system ("system") receives first player input via performance of non-wagering activity. For example, the system receives the first player input via a website, a gaming application, etc., using a computing device located outside a casino. The first player input may be received, via an application presented in a browser of the computing device. The application can present non-wagering games (e.g., casual games) that are related to a persistent-state game that integrates into a theme, story line, progression path, episodes, etc., that progress in response to non-wagering activity (e.g., in response to non-wagering games played outside a casino) as well as in response to wagering activity (e.g. in response to wagering games played inside a casino).

The flow 300 continues at processing block 304, where the system generates a first coded identifier configured for machine readability at a wagering game machine, where the first coded identifier specifies information about the non-wagering activity. In some embodiments the system can generate the first coded identifier in response to the first player input described previously. The first coded identifier can indicate, in a coded format, characteristics of the activity conducted via the first player input. The characteristics of the activity may include a value, degree, quality, subject matter, etc. related to the player (e.g., related to the player's performance, the player's location, etc.), the content, a provider of the content, the environment, etc. in relationship to the activity. For instance, in some embodiments the characteristics can describe the activity that the player performed. In some embodiments, the system can generate a coded, machine readable, unique identifier, (e.g., QR code, 2-D barcode, alpha-numeric task code, codes symbol, glyph, etc.). The coded identifier can be compact and capable of being oriented, so that a sensing device (e.g., a scanning device) on a wagering game machine can sense an orientation of markers on the coded identifier as it is displayed on a display of a mobile client. The coded identifier may be encrypted for security purposes. The coded identifier can store a lot of data which can be used to give a history of experiences in the casino or outside for use while in the casino or outside the casino. The coded identifier can be small in visible size, to fit on a display of a mobile device. If more data than will fit needs to go into coded identifier, then the system can encode access data into the coded identifier which can later be linked to when used (e.g., a Universal Resource Locator, or URL that accesses a website, a data string that access a database record, etc.).

The flow 300 continues at processing block 306, where the system provides the first coded identifier in a machine-readable format. For example, the system provides a machine-readable version of the first coded identifier to a mobile client associated with the player. The machine-readable version may include a numerical code (e.g. a unique key code for a player to later type in manually), a graphic of an optically machine-readable code (e.g. a matrix code), etc.

The flow 300 continues at processing block 308, where the system initiates a wagering game session via a wagering game machine in response to second player input. For example, after providing the first coded identifier, a player can enter a gaming establishment, such as a casino, and login to a wagering game machine using a wagering game player account. In other embodiments, a player may enter a ticket, or other form of money, into a wagering game machine. In some embodiments, the wagering game machine is not configured for account based wagering or may not have network access.

The flow 300 continues at processing block 310, where the system reads the first coded identifier, in machine-readable format, in response to third player input, The system reads the first coded identifier in various ways. For instance, in one example, a wagering game machine can accept an alpha numeric code entered via a scan, via manual input at an interface, via touchpad, etc. In another example, the system can accept a coded coupon inserted into a bill validator. In another example, the system reads coded data via a universal serial bus (USB) port/drive for the wagering game machine. In another example, the system can read the first coded identifier from a mobile client in response to a player placing a surface of a display for the mobile client against a scanning mechanism associated with the wagering game machine. In some embodiments the system utilizes a laser scanner, a near-field sensing mechanism, etc. For example a device built into the wagering game machine can include an in-cell interface that scans an image presented on a display of the mobile client (see description associated with FIGS. 4 and 5A-5C below).

The flow continues at block 311, where the system detects fourth player input during the gaming session associated with the gaming content, and generates a second coded identifier, in machine-readable format, in response to the fourth player input. After entering the first coded identifier, the system detects activity, results, conditions, events, progress, etc. that occur during a wagering game because of the fourth player input (e.g., detects progress in a game based on the player input, detects reel-stop configurations that occurred as a result of player betting, etc.). A system can generate and present the second coded identifier, via a display of a wagering game machine, to indicate the activity, results, conditions, events, progress, etc. The wagering game machine can, thus, convey the second coded identifier back to the player without using a direct communication, via a communication network, to an account-based wagering server. For example, the mobile client can also include a scanning mechanism (e.g. an in-cell display) or a conventional digital camera. The in-cell display on the mobile client scans the second coded identifier presented on the in-cell display of the wagering game machine, and vice versa. Thus the system provides two-way communication between the wagering game machine and the mobile client during the gaming session by each presenting coded identifiers to the other, thus passing information, in coded format, back and forth during the gaming session. The mobile client can transmit information related to the coded identifiers via wireless communication capabilities of the mobile client. FIGS. 4 and 5A-5C illustrate examples which will now be described.

Figure 4:
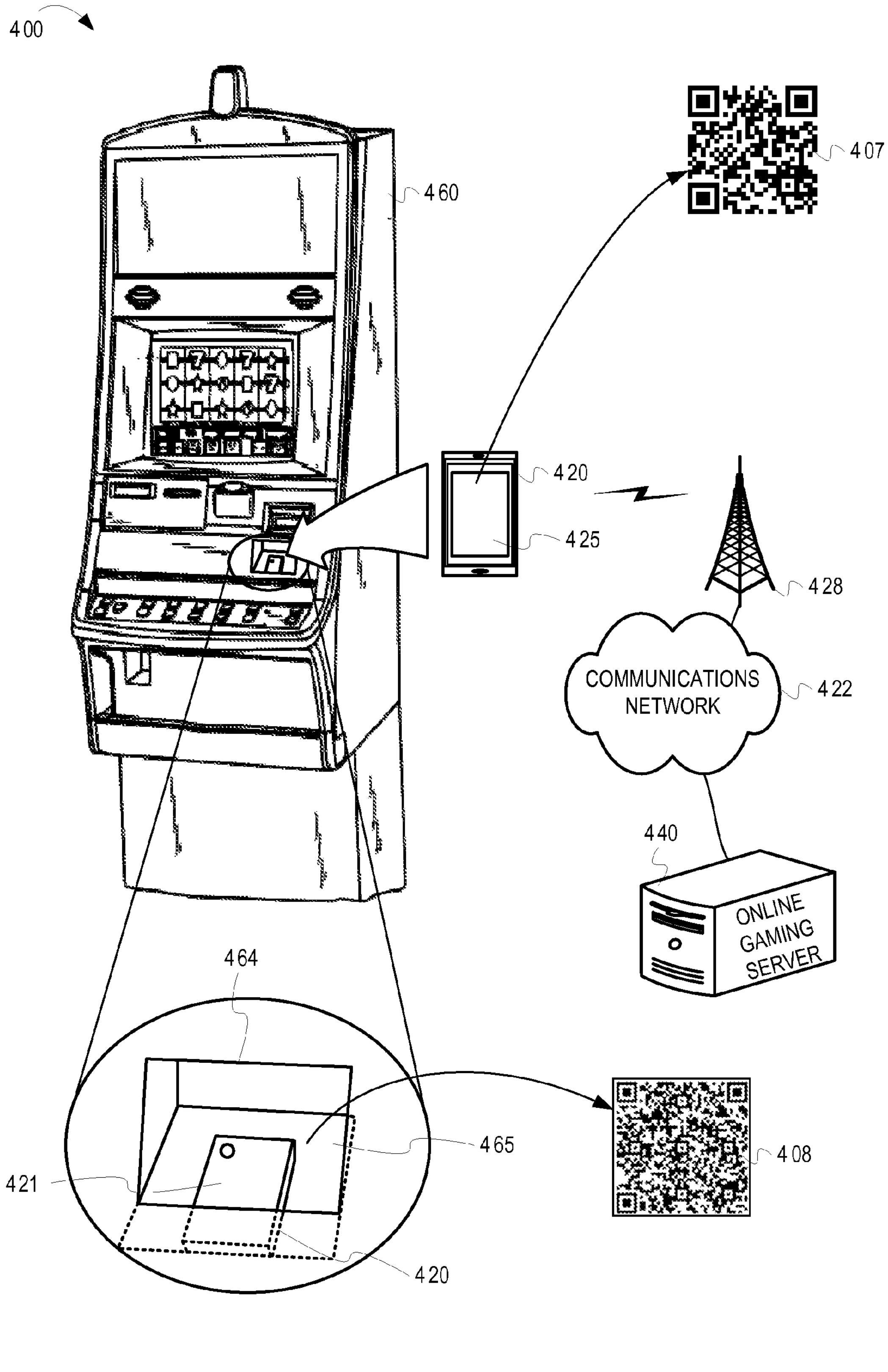
FIG. 4 is an illustration of generating and using coded identifiers for adaptive gaming, according to some embodiments.

In FIG. 4, a wagering game system ("system") 400 includes a mobile client 420 and a wagering game machine 460. The mobile client 420 can communicate, via a communications transmitting antenna 428 and via a communications network 422, to an online gaming server 440. The mobile client 420 can be inserted into a slot 464 of the wagering game machine 460 and placed onto a display 465 of the wagering game machine 460. As illustrated in FIG. 4, the mobile client 420 is flipped around so that a display 425, on the front side of the mobile client 420, is placed on the display 465. Thus, from within the slot 464, a back 421 of the mobile client is 420 visible. The display 425 presents a first coded identifier 407. The display 465 presents a second coded identifier 408. The display 425 and the display 465 are types of displays that include sensors, such as at each pixel, which sense pixel colors, light intensity, or other characteristics (e.g. capacitance) on another screen, or surface, that faces the display or that is held in close proximity to the display. The sensors can act like a scanner. In some embodiments, the slot 464 can also charge a battery of the mobile client 420, transfer gaming credits to and from the mobile client 420, etc. In addition, the wagering game machine 460, can, in some embodiments, communicate with the mobile client 420 to automatically change settings of the phone, temporarily, to prevent the phone from powering down its display 425 during the gaming session or at times when an identifier needs to be communicated. Further, the wagering game machine 460 can automatically detect visible characteristics of the display 425 (e.g., size, position, orientation, resolution, etc.) can adjust scanning techniques accordingly.

Figure 5A:
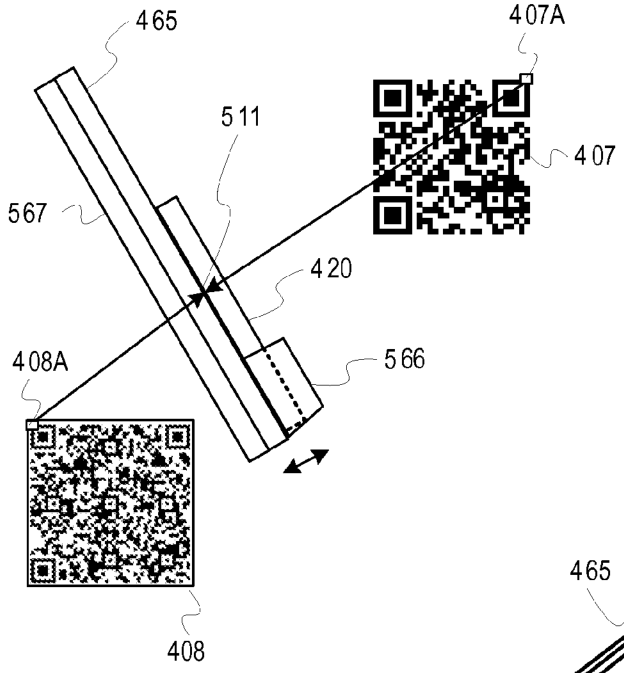
FIGS. 5A-5C are illustrations of generating and using coded identifiers for adaptive gaming, according to some embodiments.
Figure 5B:
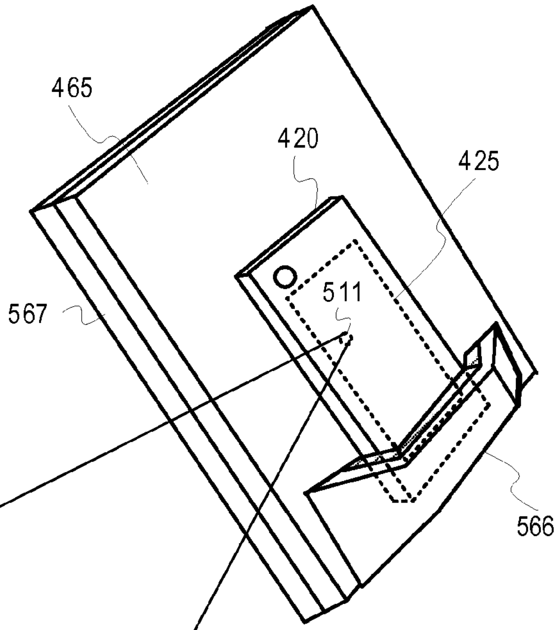
Figure 5C:
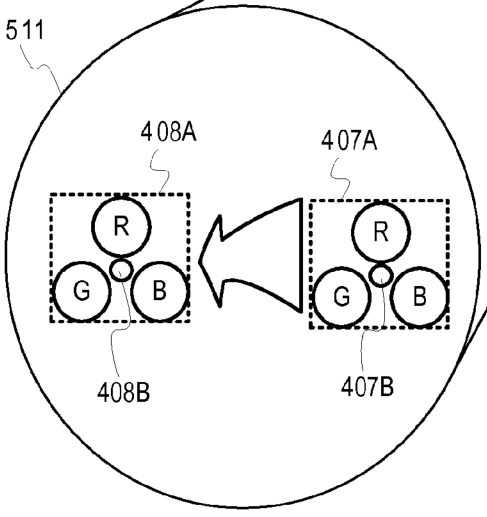

In FIGS. 5A-5C the mobile client 420 is illustrated as being positioned, as similarly shown in FIG. 4, with the display 425 facing a sensing surface of the display 465. FIG. 5A shows a side-view of the mobile client 420 laying flush against the display 465. The first coded identifier 407 and the second coded identifier 408 are presented, respectively, on the display 425 and the display 465. A holder 566 holds the mobile client 420 in a relatively stable position relative to the display 465. Further, a power charging element 567 is positioned below the display 465 so that the mobile client 420 can charge its battery during a gaming session. A pixel 407A of the first coded identifier 407 and a pixel 408A of the second coded identifier 408 are associated with a point 511, or each of the display 425 and the display 465, where the pixel 408A and the pixel 407A directly face each other. FIG. 5B shows another viewing angle of what is illustrated in FIG. 5A, except that FIG. 5B does not show a side view, but a perspective view. In FIG. 5C, an expanded view of the point 511 indicates that the pixels 407A and 408A include display elements (e.g., Red, Green, and Blue pixel elements) as well as sensing elements (e.g., a sensor 408B associated with the pixel 408A and a sensor 407B associated with the pixel 407A). Thus, when the first coded identifier 407 faces the display 465, the sensor 408B detects the pixel 407A and scans an optical characteristic of pixel 407A (e.g., scans a color, intensity, contrast, hue, transparency, sequential lighting pattern, etc., of red, green, and/or blue light photon values of pixel 407A either as separate values for each of the RGB elements or in combination). Vice versa, when the second coded identifier 408 faces the display 425, the sensor 407B detects the pixel 408A and scans an optical characteristic of pixel 408A (e.g., scans a color, intensity, contrast, hue, transparency, sequential lighting pattern, etc., of red, green, or blue light photon values of pixel 408A, either as separate values for each of the RGB elements or in combination). The sensors 407B or 408B, or other sensors on the display 425 or 465, can further detect markers to determine orientation of the graphical symbol associated with the first identifier 407 and/or the second identifier 408, and read data from the graphical symbols using the sensors 407B or 408B. The location of the pixels 407A and 408B are shown as facing each other at the same point 511 with the first coded identifier 407 and the second coded identifier 408 being aligned in a mirrored, face-to-face orientation. However, in other embodiments, the first coded identifier 407 and the second coded identifier 408 do not have to match up with each other in a mirrored, face-to-face orientation, as they may be presented at different times or in different positions on the display 425 or the display 465 completely independent of each other. However, to ensure accurate scanning, the first identifier 407, should face an area or boundary of the display 465 that can scan the entire image (i.e., all parts of the first identifier 407 should be viewable to the display 465) and vice versa (i.e., all parts of the second identifier 408 should be viewable to the display 425). Although, in some embodiments, if a portion of the display 425 or the display 465 could not view a portion of the respective coded identifier (e.g., if a pixel on the display 425 is broken, smudged, or otherwise un-viewable), then the scanning devices of the display 425 or display 465 can extrapolate some data given the remainder of the pixels that can be viewed and scanned. The wagering game machine 460 and the mobile client 420 then utilize the data (e.g., to share values related to a persistent-state game associated with a primary wagering game presented on the wagering game machine 460). As explained previously, the holder 566 holds the mobile client 420 in a relatively stable position. However, because the sensors 407B or 408B can detect markers within the graphical symbols associated with the first identifier 407 or the second identifier 408, the mobile client 420 does not have to fit perfectly into the holder 566 or be aligned perfectly to a border of the display 465, as the scanning devices of the display 425 or the display 465 can reorient any scanned images using the markers.

Returning to FIG. 3, the flow 300 continues at processing block 312, where the system adapts gaming content in response to the first coded identifier and/or the second coded identifier. For example, in some embodiments, the system modifies, customizes, tailors, etc. the gaming content based on the information included in the coded identifiers. For example, the system can read data from the first coded identifier that specifies that the player had reached a specific level in a persistent-state game associated with a wagering game theme for the wagering game machine. The system can determine a wagering game related reward associated with the data specified in the first identifier (e.g., system unlocks specific wagering game content, such as episodic content, a bonus game, game features, etc. according to a degree of progress, or level, attained in the persistent-state game as specified via the coded information of the first coded identifier).

In some embodiments, the system uses the second coded identifier to unlock non-wagering content accessible either during the wagering game session (e.g., for use during a wagering game played during the wagering game session), after the wagering game session but while still in a casino (e.g., for use during a wagering game played in a subsequent wagering game session, for use during a group event at the casino, etc.) or after the player leaves the casino (e.g., for content accessible via a website).

Additional Example Embodiments

According to some embodiments, a wagering game system ("system") can provide various example devices, operations, etc., to use coded identifiers for adaptive gaming. The following non-exhaustive list enumerates some possible embodiments.

Additional Examples of Adapting Gaming Content Based on Information in Coded Identifiers.

In some embodiments, the system can use coded identifiers to modify gaming outcomes, payouts, etc. For example, the system can provide multiple coded identifiers that a player can collect. Each coded identifier can represent a reel-stop position of a reel. During a wagering game session, the system can read each of the multiple coded identifiers separately, detect a coded value indicated in each of the coded identifiers, and present a reel-stop position on a wagering game machine for each of the coded identifiers.

In some embodiments, the system can modify a payout amount via use of a specific coded identifier. For example, if a player has a specific coded identifier, then the wagering game will payout a maximum payout.

In some embodiments, the system can utilize a coded identifier to present or fund a bonus game.

In some embodiments, the system can provide coded identifiers in game-play elements (e.g., when a reel stops spinning the system presents a coded identifier, when a player gets a specific card configuration the system presents a coded identifier, etc.). The coded identifier can be used in a wagering game as an asset, to modify math and pay-tables of a wagering game, to modify visual and aesthetic elements of a wagering game etc. A mobile client can store the coded identifiers for later use (e.g., can snap a picture of the coded identifier with a camera on the mobile client, read the identifier via an in-cell display, etc. and store in a memory associated with the mobile client). In some embodiments, the system can transfer the coded identifier to a player's account and present the coded identifier via an online account access at a later time.

In some embodiments, shops at a casino property can be tied into the system. When a patron buys an item from the shop (e.g., high heels), the system can generate a coded identifier which, when read subsequently at a wagering game machine, can present a graphical representation of the item that was purchased on an avatar type pet or critter associated with a wagering game player account. In some embodiments, the system can cause the graphical representation of the item to appear without using a coded identifier.

In some embodiments, the system can read a coded identifier provided by a third party that is unrelated to gaming and use data from the coded identifier for gaming purposes. For example, the system can scan a 2D barcode from a boarding pass for an airplane. Via the scanning of the 2D barcode, the system can detect an airport that the casino patron came through so that hometown sports themes can be available for graphical representation in game graphics, on avatars, etc. The system can further detect airline profile settings, types of airline fare (e.g., first class versus coach), etc. Based on the type of airline fare, for example, the system could offer different priced gaming offers during the gaming session, different levels of service or complimentaries, etc. The system can also perform other services during the gaming session, such as reading a 2D barcode to check a player into a flight. In some embodiments, the system can read coded identifiers from in-flight magazines that modify content within a gaming session. In other embodiments, the system can track, via scan of an airline boarding pass barcode, how long a flight took, how long it took the patron to get from the airport to the casino or to a wagering game machine, etc. and, based on the timing, adapt content during the gaming session, provide specific services, etc.

In some embodiments, the system can provide a coded identifier to be read by third party scanners. For example, during a gaming session, the system can offer a barcode that the patron can use to check in at an airport (e.g., a boarding pass barcode), a hotel, or other establishments, retailers, service providers, etc. The system can transfer the barcodes to the patron's personal device (e.g., to a personal mobile client, such as a smartphone). The system can also provide, within the third-party barcodes, offers for services or products in-flight, at a hotel, or at the other establishments, retailers, service providers, etc.

In some embodiments, the system can further track activities performed in the casinos and provide coded identifiers that identify characteristics of the activities. For instance, the system can track group activities (e.g., during a scavenger hunt) or other group event and provide rewards for the activities or events in the form of coded identifiers. The coded identifiers can indicate experiences that a casino patron experienced in a casino (e.g., the coded identifiers can store data about services and products ordered in the casino, data about games played, identification numbers of wagering game machines visited, etc.). A patron can use the barcodes to later print out receipts, present a video replay of gaming experiences, track movement within the casino, etc.

In some embodiments, the system can generate and/or read coded identifiers that specify marketing information about what the player did while outside a casino (e.g., visited a specific website, bought a specific product online, etc.).

In some embodiments, the system can customize game features based on data specified in a coded identifier. For example, some coded identifiers can modify a game theme. In some embodiments, the system can read coded identifiers, and based on the data in the coded identifier, create a character for gaming content, modify characteristics of a character, etc. In some embodiments, the system can offer games based on the coded identifier that otherwise would not be available (e.g., access to new games before other players, access to restricted games only available with the right coded identifier, etc.).

In some embodiments, the system can calculate combinations of coded identifiers. For example, combinations of coded identifiers can be more valuable than single coded identifiers, such as to provide a special feature, bonus, etc.

In some embodiments, the system can provide a set of coded identifiers that are collectable as a set. The system can provide different conditions for attaining the set (e.g., require that a player play at multiple wagering game machines, require that a player play multiple games in the casino, etc.).

In some embodiments, the system can offer a secondary economy or forum for trading coded identifiers that a player may have collected more than once and/or to combine with other coded identifiers.

In some embodiments, the system can offer coded identifiers that are unique to a specific casino property (e.g., coded identifiers associated with a well known character, branding, etc., which is available only at a certain casino).

In some embodiments, the system can generate advertisements based on data in a coded identifier.

In some embodiments, the system can analyze similar characteristics of coded identifiers, similarities of players with the coded identifiers, similarities between players who use specific coded identifiers, etc. and use analysis to adapt the gaming experience based on the similarities.

Conduct Wagering Activity Via a Mobile Client Connected to a Wagering Game Machine.

In some embodiments, a wagering game machine, or other gaming device in a casino, can communicate with a player's mobile client to fund gaming session activities. For example, a player's mobile client can run an application that transfers gaming credits, money, etc. to and from a wagering game machine. For instance, the application on the mobile client allows the user to login to a third-party service that tracks player accounts that the player uses for different casinos. The third-party service provides a master account in which funds are stored. When the player wants to use funds, at a specific casino, then the application can generate a coded identifier specific to a player account that corresponds to that casino. The player can use the coded identifier to login to a wagering game machine (eliminating a need to carry around multiple player cards) and transfer money from the master account to the player account that corresponds to that casino, and/or then to gaming session (e.g., to a gaming session credit balance). In other examples, the system can provide mechanisms for a player who does not have a player account to utilize a coded identifier to transfer gaming credits purchased, or attained, from a kiosk, bank, etc. at a casino. The coded identifier, therefore, can represent a ticket-in-ticket-out (TITO) type of identifier used to fund a gaming session. The system can transfer the coded identifier to the player's mobile client instead of printing the coded identifier on paper. In some embodiments, the system can move funds between machines by taking pictures of a wagering game machine screen and entering the picture at a next wagering game machine. The next wagering game machine reads (e.g., scans) the picture and continues a previous game or uses information about a previous game/session (e.g., transfer's balance/credits from one machine to another, even between machines made by different manufacturers). To incentivize a player to transfer funds from one manufacturer's wagering game machine to a second manufacturer's wagering game machine, the system could offer an increase to the number of credits. As a security measure, the coded identifier can provide a pointer back to a value that is stored in a casino account.

Additional Example Operating Environments

This section describes additional example operating environments, systems, networks, etc. and presents structural aspects of some embodiments.

Wagering Game Computer System

Figure 6:
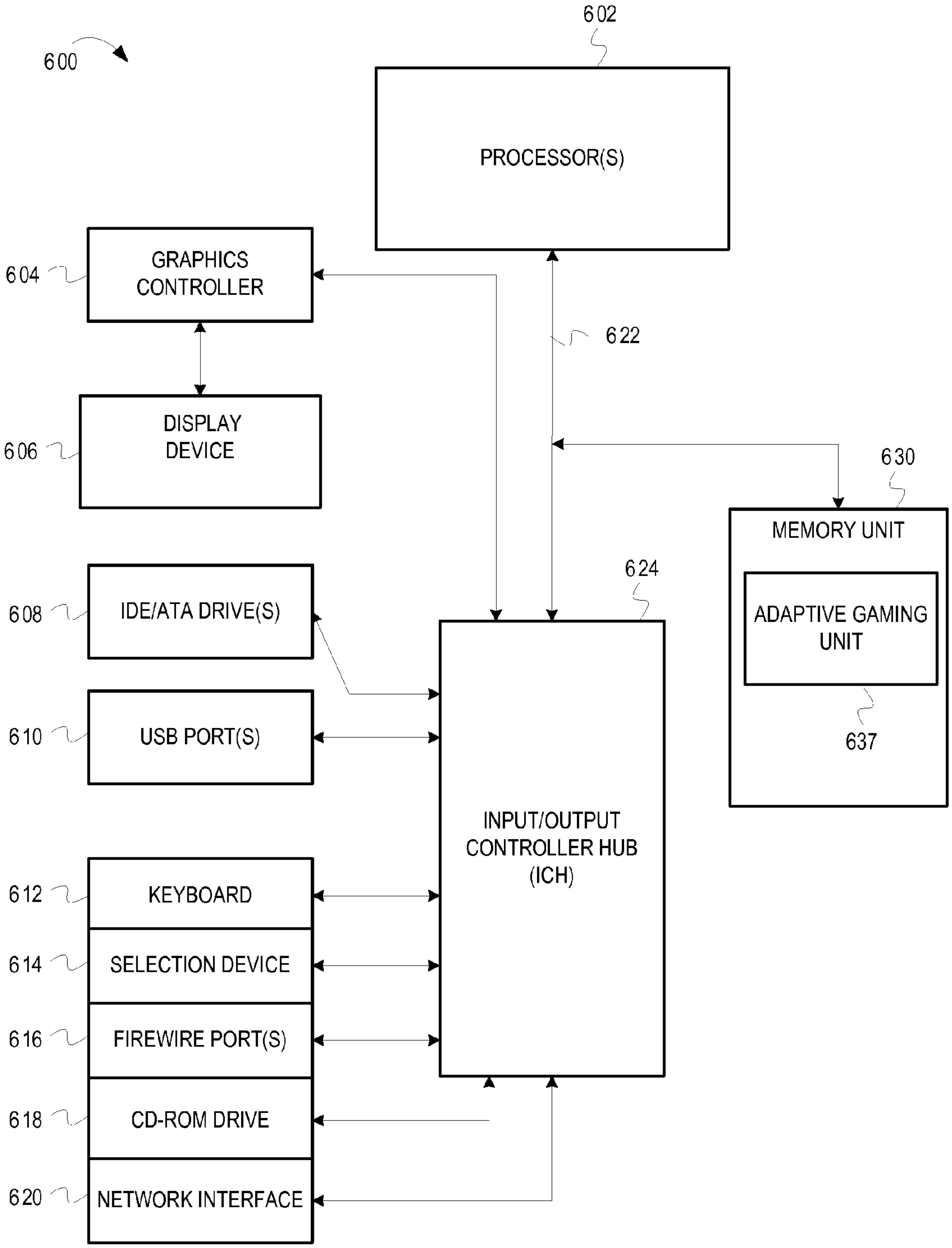
FIG. 6 is an illustration of a wagering game computer system 600, according to some embodiments.

FIG. 6 is a conceptual diagram that illustrates an example of a wagering game computer system 600, according to some embodiments. In FIG. 6, the wagering game computer system ("computer system") 600 may include a processor unit 602, a memory unit 630, a processor bus 622, and an Input/Output controller hub (ICH) 624. The processor unit 602, memory unit 630, and ICH 624 may be coupled to the processor bus 622. The processor unit 602 may comprise any suitable processor architecture. The computer system 600 may comprise one, two, three, or more processors, any of which may execute a set of instructions in accordance with some embodiments.

The memory unit 630 may also include an I/O scheduling policy unit and I/O schedulers. The memory unit 630 can store data and/or instructions, and may comprise any suitable memory, such as a dynamic random access memory (DRAM), for example. The computer system 600 may also include one or more suitable integrated drive electronics (IDE) drive(s) 608 and/or other suitable storage devices. A graphics controller 604 controls the display of information on a display device 606, according to some embodiments.

The ICH 624 provides an interface to I/O devices or peripheral components for the computer system 600. The ICH 624 may comprise any suitable interface controller to provide for any suitable communication link to the processor unit 602, memory unit 630 and/or to any suitable device or component in communication with the ICH 624. The ICH 624 can provide suitable arbitration and buffering for each interface.

For one embodiment, the ICH 624 provides an interface to the one or more IDE drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, selection device 614 (e.g., a mouse, trackball, touchpad, etc.), CD-ROM drive 618, and one or more suitable devices through one or more firewire ports 616. For one embodiment, the ICH 624 also provides a network interface 620 though which the computer system 600 can communicate with other computers and/or devices.

The computer system 600 may also include a machine-readable storage medium that stores a set of instructions (e.g., software) embodying any one, or all, of the methodologies to use coded identifiers for adaptive gaming. Furthermore, software can reside, completely or at least partially, within the memory unit 630 and/or within the processor unit 602. The computer system 600 can also include an adaptive gaming unit 637. The adaptive gaming unit 637 can process communications, commands, or other information, to use coded identifiers for adaptive gaming. Any component of the computer system 600 can be implemented as hardware, firmware, and/or machine-readable storage media including instructions for performing the operations described herein.

Personal Wagering Game System

Figure 7:
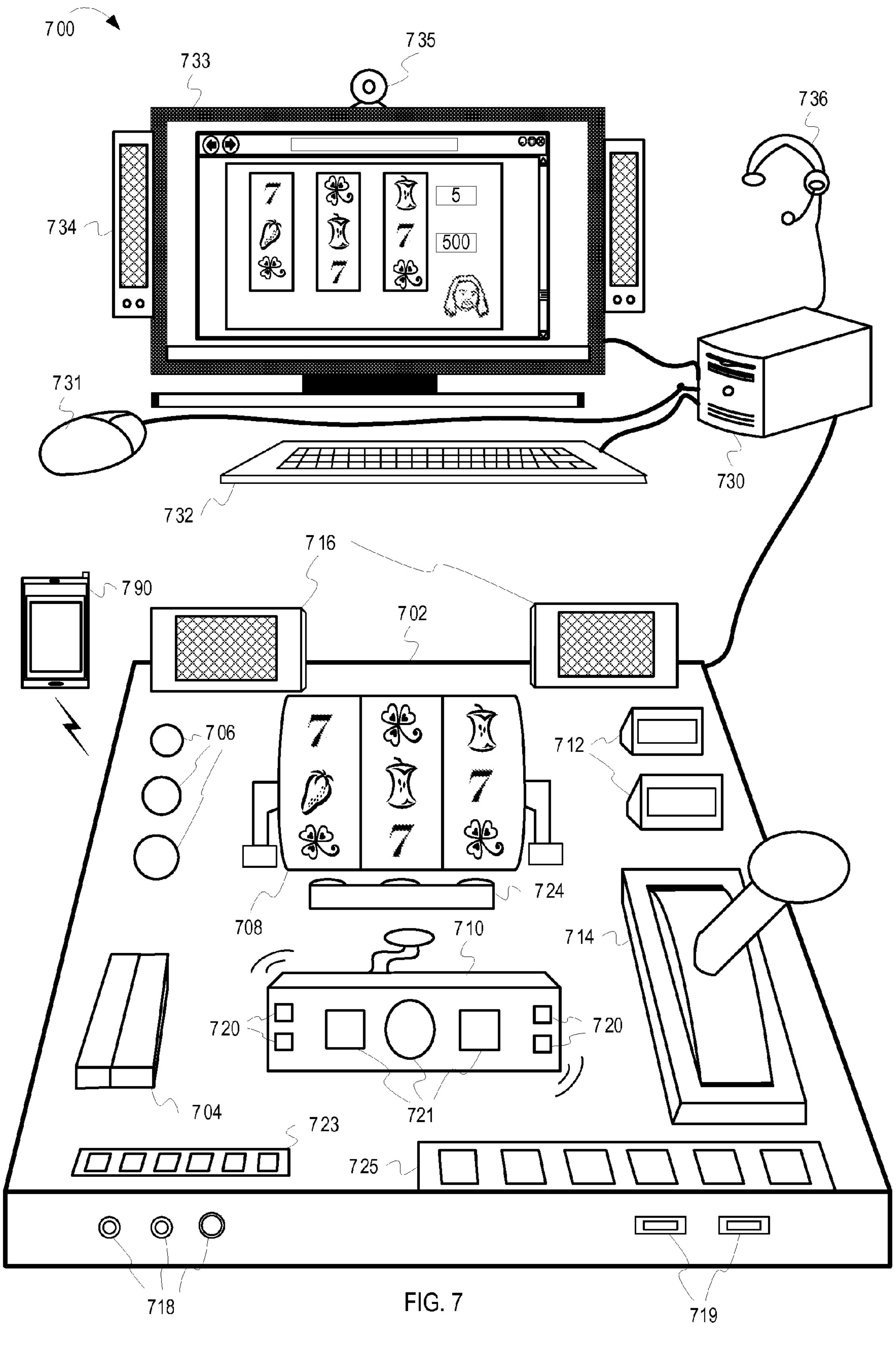
FIG. 7 is an illustration of a personal wagering game system 700, according to some embodiments.

FIG. 7 is a conceptual diagram that illustrates an example of a personal wagering game system 700, according to some embodiments. In FIG. 7, the personal wagering game system ("system") 700 includes an exemplary computer system 730 connected to several devices, including user input devices (e.g., a keyboard 732, a mouse 731), a web-cam 735, a monitor 733, speakers 734, and a headset 736 that includes a microphone and a listening device. In some embodiments, the webcam 735 can detect fine details of a person's facial features, from an eye-level perspective. The web-cam 735 can use the fine detail to determine a person's identity, their demeanor, their facial expressions, their mood, their activities, their eye focus, etc. The headset 736 can include biometric sensors configured to detect voice patterns, spoken languages, spoken commands, etc. The biometric sensors in the web-cam 735 can detect colors (e.g., skin colors, eye colors, hair colors, clothing colors, etc.) and textures (e.g., clothing material, scars, etc.). The biometric sensors in the web-cam 735 can also measure distances between facial features (e.g., distance between eyes, distance from eyes to nose, distance from nose to lips, length of lips, etc.). The system 700 can generate a facial and body map using the detected colors, textures, and facial measurements. The system 700 can use the facial and body map to generate similar facial features and body appearances for a player account avatar. Also connected to the computer system 730 is a gaming control device ("gaming pad") 702 including wagering game accoutrements associated with wagering games. The wagering game accoutrements include one or more of reels 708, game meters 712, indicators 706, a game control device 710, a physical lever 714, a magnetic card reader 704, a video projection device 724, input/output ports 718, USB ports 719, and speakers 716. The gaming pad 702 can present feedback of online activities. For instance, the gaming pad 702 can use vibrations and signals on the gaming control device (e.g., the game control device 710 or the physical lever 714 can vibrate to indicate a back pat from another player or a game celebration, the indicators 706 can blink, etc.). The physical lever 714 can produce feelings in the lever to emulate a pulling feel or a vibration. The video projection device 724 can project video onto the reels 708 so that the reels 708 can present many different types of wagering games. The reels 708 can spin when the physical lever 714 is pulled. The video projection device 724 can project reel icons onto the reels 708 as they spin. The video projection device 724 can also project reel icons onto the reels 708 when the reels 708 are stationary, but the imagery from the video project device 724 makes the reels 708 appear to spin. The magnetic card reader 704 can be used to swipe a credit card, a player card, or other cards, so that the system can quickly get information. The system 700 can offer lower rates for using the magnetic card reader 704 (e.g., to get a lower rate per transaction). The game control device 710 can include an emotion indicator keypad with keys 720 that a player can use to indicate emotions. The game control device 710 can also include biometric devices 721 such as a heart-rate monitor, an eye pupil dilation detector, a fingerprint scanner, a retinal scanner, voice detectors, speech recognition microphones, motion sensors, sound detectors, etc. The biometric devices 721 can be located in other places, such as in the headset 736, within a chair (not shown), within personal control devices (e.g. joysticks, remote controls, game pads, roller-balls, touch-pads, touch-screens, etc.), within the web-cam 735, or any other external device. The external devices can be connected to the computer 730 or to the game control device 710 via the input/output ports 718. In some embodiments, the game pad 702 communicates with a mobile client 790. As a security feature, some biometric devices can be associated with some of the gaming pad devices (e.g., the magnetic card reader 704), such as a fingerprint scanner, a retinal scanner, a signature pad to recognize a player's signature, etc. The game control device 710 can also use the keys 720 to share items and control avatars, icons, game activity, movement, etc. within a network wagering venue. The game pad can also have an electronic (e.g., digital) button panel 725, an electronic control panel 723, or any other type of changeable panel that can change appearance and/or configuration based on the game being played, the action being performed, and/or other activity presented within an online gaming venue. The game control device 710 can also move in different directions to control activity within the online gaming venue (e.g., movement of a player's avatar moves in response to the movements of the game control device 710). Avatars can be pre-programmed to act and look in certain ways, which the player can control using the system 700. The gaming pad 702 can permit the player to move the avatar fluidly and more easily than is possible using a standard keyboard. The system 700 can cause an avatar to respond to input that a player receives via the gaming pad 702. For example, a player may hear a sound that comes primarily from one direction (e.g., via stereophonic signals in the headset 736) within the network wagering venue. The system 700 can detect the movement of the player (e.g., the system 700 detects that a player moves his head to look in the direction of the sound, the player uses the game control device 710 to move the avatar's perspective to the direction of the sound, etc.). The system 700 can consequently move the avatar's head and/or the avatar's perspective in response to the player's movement. The player can indicate an expression of an emotion indicated by the player using the keys 720. The system 700 can make the avatar's appearance change to reflect the indicated emotion. The system 700 can respond to other movements or actions by the player and fluidly move the avatar to respond. The system 700 can also interpret data provided by the biometric devices and determine expressions and/or indications of emotions for a player using the system 700.

Wagering Game Machine Architecture

Figure 8:
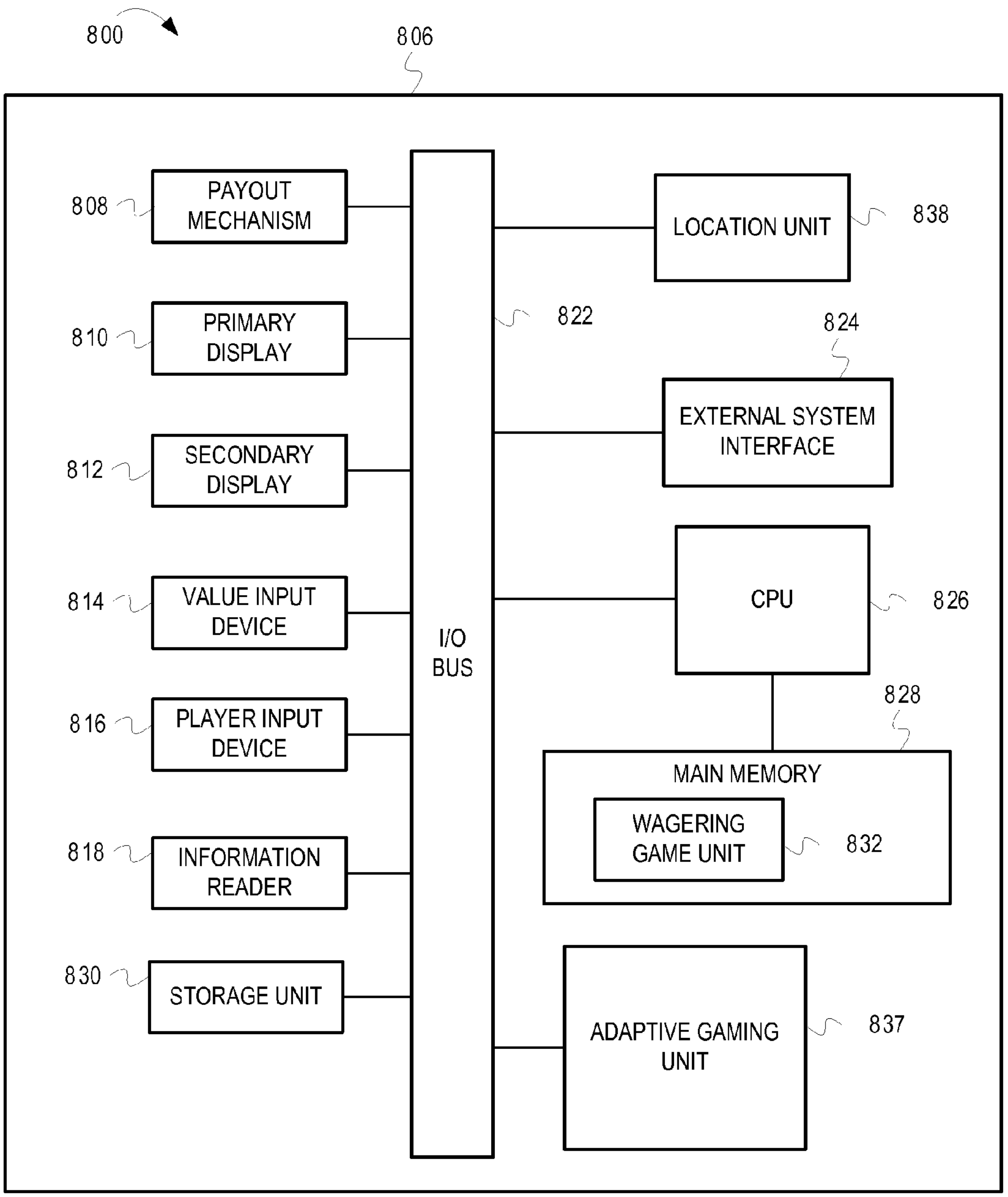
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes an adaptive gaming unit 837. The adaptive gaming unit 837 can process communications, commands, or other information, where the processing can use coded identifiers for adaptive gaming.

Furthermore, any component of the wagering game machine 806 can include hardware, firmware, and/or machine-readable storage media including instructions for performing the operations described herein.

Wagering Game Machine

Figure 9:
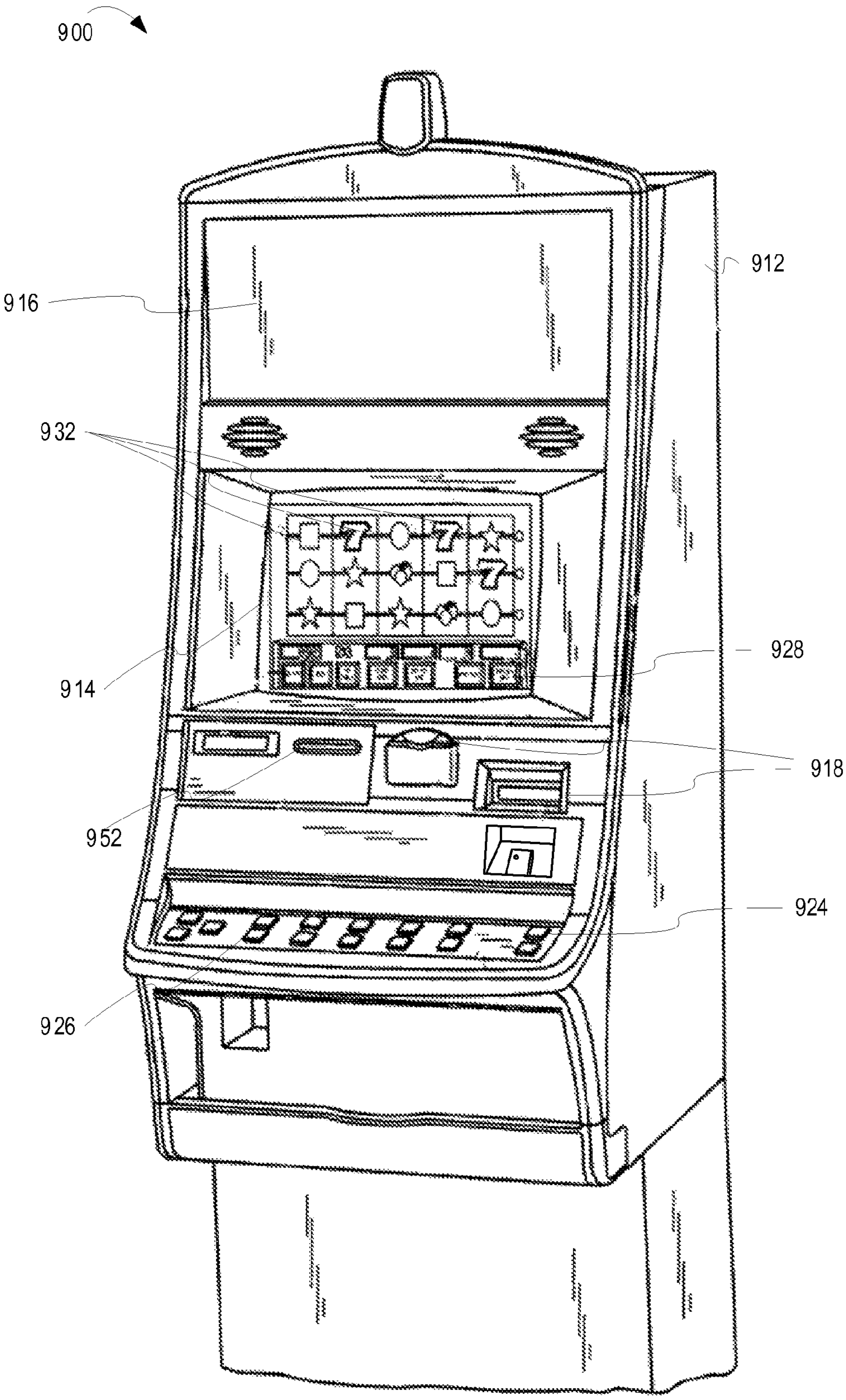
FIG. 9 is an illustration of a wagering game machine 900, according to some embodiments.

FIG. 9 is a conceptual diagram that illustrates an example of a wagering game machine 900, according to some embodiments. Referring to FIG. 9, the wagering game machine 900 can be used in gaming establishments, such as casinos. According to some embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), a three-dimensional (3D) display, or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a free standing model, bar top model, mobile handheld model, or workstation console model.

A player begins playing a basic wagering game by making a wager via the value input device 918. The player can initiate play by using the player input device's buttons or touch screen 928. The basic game can include arranging a plurality of symbols 932 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A system comprising:

a mobile device configured to:

receive, from a wagering game server, a first coded identifier;

present graphically on a display device of the mobile device, to a wagering game machine during a wagering game session, the first coded identifier, wherein the wagering game machine includes an electronic display device, one or more electronic input devices, and one or more controllers configured to:

detect, via at least one of one or more electronic input devices, a physical item associated with a monetary value that establishes a credit balance, initiate the wagering game session in response to an input indicative of a wager covered by the credit balance, and receive, via at least one of the one or more electronic input devices, a cashout input that initiates a payout from the credit balance;

in response to the presentation of the first coded identifier to the wagering game machine, detect presentation of a second coded identifier presented by the wagering game machine;

capture, via an image capture device of the mobile device, the second coded identifier; and transmit, to the wagering game server, the second coded identifier.

2. The system of claim 1, the wagering game machine further configured to:

receive, from the mobile device, the first coded identifier, wherein the first coded identifier identifies at least one characteristic associated with an activity performed prior to initiation of the wagering game session;

transmit, to the mobile device, a command, wherein the command causes the display device of the mobile device to remain illuminated during the wagering game session;

present wagering game content during the wagering game session, based, at least in part, on the at least one characteristic identified by the first coded identifier;

receive player input for the wagering game content;

determine, in response to the player input for the wagering game content, information about the wagering game session; and generate the second coded identifier, wherein the second coded identifier identifies the information about the wagering game session.

3. The system of claim 2, wherein the information about the wagering game session indicates one or more of player activity during the wagering game session, results of the wagering game session, conditions of the wagering game session, events occurring during the wagering game session, and the player's progress in a wagering game during the wagering game session.

4. The system of claim 2, wherein the wagering game machine configured to receive, from the mobile device, the first coded identifier includes the wagering game machine configured to scan a graphical representation of a matrix barcode via one or more scanning elements embedded in a display of the wagering game machine from which the wagering game content is presented.

5. The system of claim 4, wherein the wagering game machine configured to scan the graphical representation of the matrix barcode includes the wagering game machine configured to scan the first coded identifier while the first coded identifier is presented on a display device of the mobile device via an in-cell interface of the wagering game machine from which the wagering game content is presented.

6. The system of claim 2, the wagering game machine further configured to modify presentation of the wagering game content, based on the at least one characteristic identified by the first coded identifier, via one or more of generating a wagering game offer associated with the wagering game content, unlocking a portion of the wagering game content, customizing features of the wagering game content, changing a configuration of game play elements in the wagering game content, changing a character presented via the wagering game content, modifying a theme of the wagering game content, modifying a payout threshold associated with the wagering game content, and modifying an amount of monetary wagering units associated with the wagering game session.

7. One or more machine-readable storage media having instructions stored thereon, which when executed by a set of one or more processors causes the set of one or more processors to perform operations comprising:

receiving, from a wagering game server prior to initiation of a wagering game session, a first coded identifier, wherein the first coded identifier identifies at least one characteristic performed prior to initiation of the wagering game session;

graphically presenting, to a wagering game machine, the first coded identifier, wherein the wagering game machine includes an electronic display device, one or more electronic input devices, and one or more controllers configured to:

detect, via at least one of one or more electronic input devices, a physical item associated with a monetary value that establishes a credit balance, initiate the wagering game session in response to an input indicative of a wager covered by the credit balance, and receive, via at least one of the one or more electronic input devices, a cashout input that initiates a payout from the credit balance;

after initiation of the wagering game session, detecting presentation of a second coded identifier presented by the wagering game machine, wherein the second coded identifier includes information about the wagering game session;

capturing the second coded identifier; and transmitting, to the wagering game server, the second coded identifier.

8. The one or more machine-readable storage media of claim 7, wherein the presenting, to the wagering game machine, the first coded identifier comprises:

presenting, on an additional display device, the first coded identifier, wherein the additional display device is configured with a plurality of sensors within the additional display device configured to scan pixels of a graphical representation of second coded identifier presented by the wagering game machine.

9. The one or more machine-readable storage media of claim 7, wherein the wagering game session includes wagering game content, and wherein the presenting, to the wagering game machine, the first coded identifier causes modification of the wagering game content.

10. The one or more machine-readable storage media of claim 9, wherein the modification of the wagering game content comprises one or more of unlocking a portion of the wagering game content based on at least one value that corresponds to the at least one characteristic.

11. The one or more machine-readable storage media of claim 7, wherein the information about the wagering game session indicates one or more of player activity during the wagering game session, results of the wagering game session, conditions of the wagering game session, events occurring during the wagering game session, and the player's progress in a wagering game during the wagering game session.

12. A system comprising:

a wagering game machine including:

one or more processing units;

an electronic display device, one or more electronic input devices, and one or more controllers configured to:

detect, via at least one of one or more electronic input devices, a physical item associated with a monetary value that establishes a credit balance, initiate a wagering game in response to an input indicative of a wager covered by the credit balance, and receive, via at least one of the one or more electronic input devices, a cashout input that initiates a payout from the credit balance;

a scanning device configured to scan a first coded identifier and determine information associated with a first content; and one or more machine readable storage devices including a program executable on the one or more processing units, wherein the program includes program code configured to:

present second content based, at least in part, on the information associated with the first content, detect an event that occurs during a wagering game session in response to player input associated with the second content, generate a second coded identifier including information associated with the event, and present, to a mobile client for transmission to a wagering game server, the second coded identifier; and the mobile client comprising:

a display configured to present the first coded identifier for scanning by the wagering game machine, one or more sensors configured to optically scan the second coded identifier; and a communication unit configured to wirelessly transmit, to the wagering game server, the second coded identifier.

13. The system of claim 12, wherein the wagering game server is configured to receive, from the mobile client, the second coded identifier.

14. The system of claim 12, the program code further configured to detect placement of a first surface of the display in proximity to a second surface of the scanning device, detect a position of the first coded identifier on the first surface, and scan the first coded identifier via the scanning device.

15. The system of claim 12, wherein the wagering game server is configured to, prior to the wagering game session, generate the first coded identifier, and provide the first coded identifier to the mobile client.

16. The system of claim 12, wherein the wagering game server is configured to receive the second coded identifier from the mobile client, and update a setting related to a player account based on the second coded identifier.

17. The system of claim 12, wherein the first content is one of non-wagering game content associated with an online game session and wagering game content associated with a previous wagering game session, and the second content is wagering game content associated with the wagering game session.

18. The system of claim 12, wherein the one or more additional characteristics includes one or more of player activity during the wagering game session, results of the wagering game session, conditions of the wagering game session, events occurring during the wagering game session, and progress of a player in a wagering game during the wagering game session.

19. A method comprising:

initiating a wagering game session on a wagering game machine, wherein wagering game content is presentable during the wagering game session, and wherein the wagering game machine includes an electronic display device, one or more electronic input devices, and one or more controllers configured to:

detect, via at least one of one or more electronic input devices, a physical item associated with a monetary value that establishes a credit balance, and initiate the wagering game session in response to an input indicative of a wager covered by the credit balance;

scanning, by the wagering game machine, a first coded identifier, in response to player input associated with the wagering game session, wherein the first coded identifier indicates at least one characteristic associated with an activity performed prior to initiation of the wagering game session;

presenting, via the electronic display device, the wagering game content during the wagering game session based, at least in part, on the at least one characteristic indicated in the first coded identifier in response to the scanning of the first coded identifier;

receiving, at the wagering game machine, player input for the wagering game content;

determining, in response to the player input, information about the wagering game session;

generating, by the wagering game machine, a second coded identifier including the information about the wagering game session;

presenting, to a mobile device for extraction of the information about the wagering game session and transmission of the information about the wagering game session to a wagering game server, the second coded identifier;

receiving, at the wagering game server from the mobile device, the information about the wagering game session; and receiving, via at least one of the one or more electronic input devices, a cashout input that initiates a payout from the credit balance to end the wagering game session.

20. The method of claim 19 wherein one or more of the first coded identifier and the second coded identifier is one or more of a coded symbol, a glyph, a matrix barcode, a quick response code, and a two-dimensional barcode.

21. The method of claim 19, wherein the information about the wagering game session indicates one or more of player activity during the wagering game session, results of the wagering game session, conditions of the wagering game session, events occurring during the wagering game session, and progress of a player in a wagering game during the wagering game session.

* * * * *